May 31, 1938.                J. COSENTINO                2,119,453
                              SHOCK ABSORBER
                          Filed Feb. 24, 1937              3 Sheets-Sheet 1
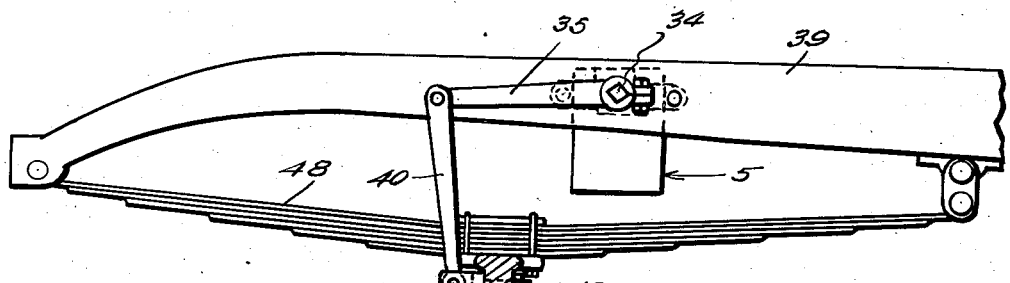
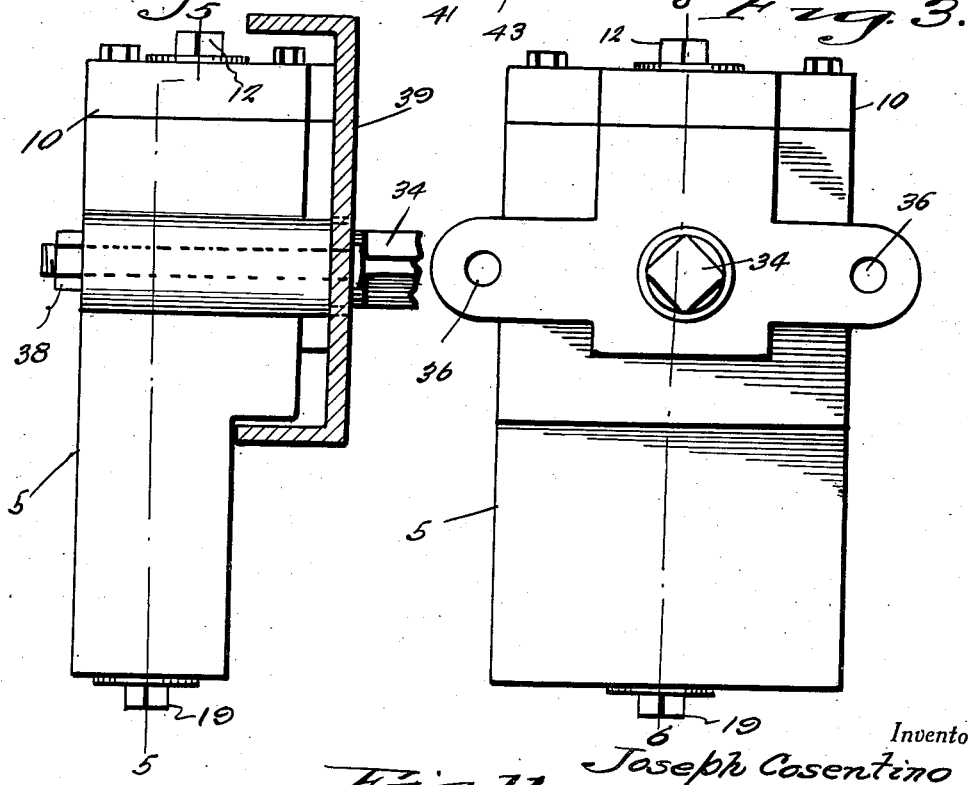
Inventor
Joseph Cosentino

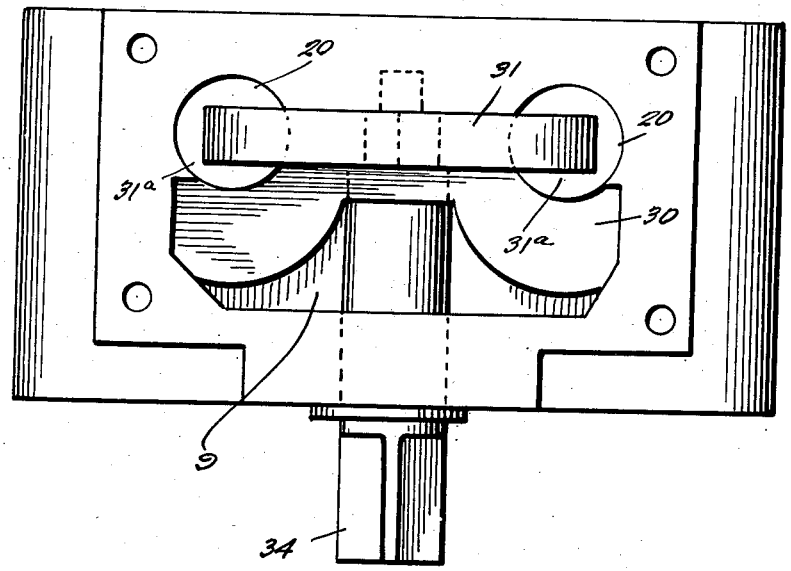
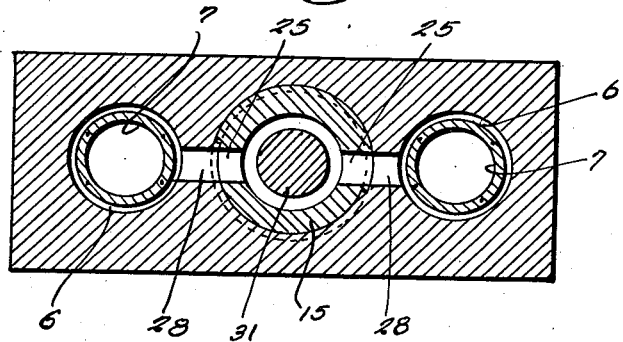
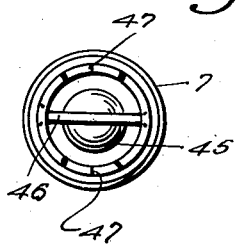

May 31, 1938.    J. COSENTINO    2,119,453
SHOCK ABSORBER
Filed Feb. 24, 1937    3 Sheets-Sheet 3
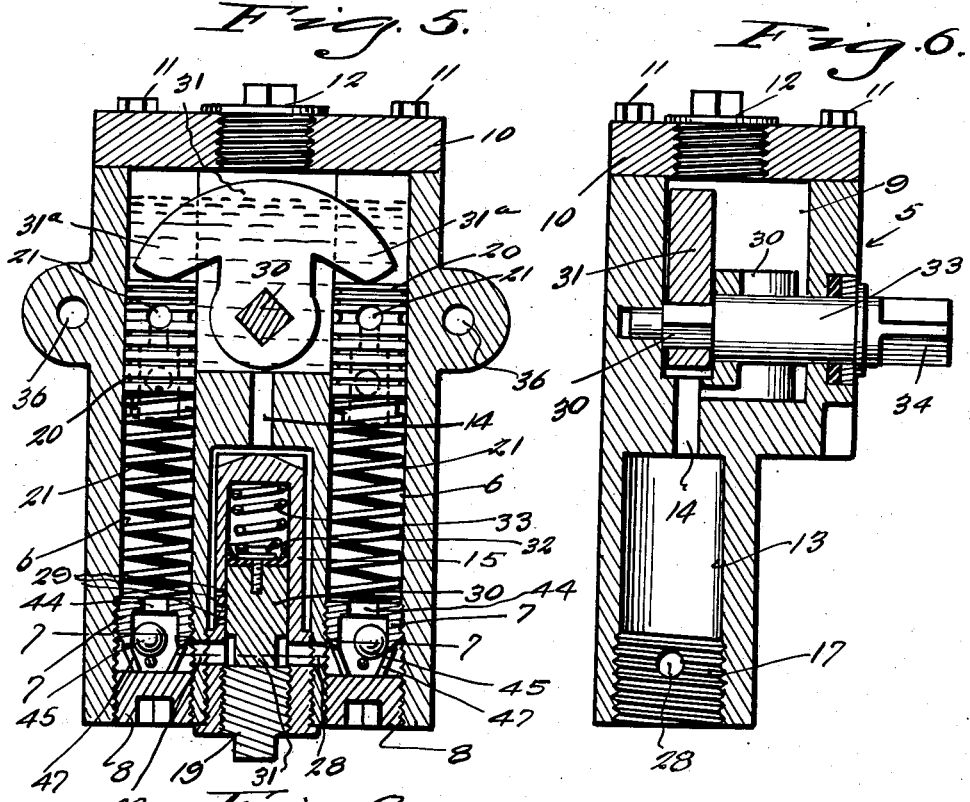
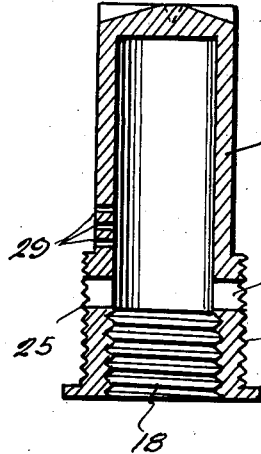
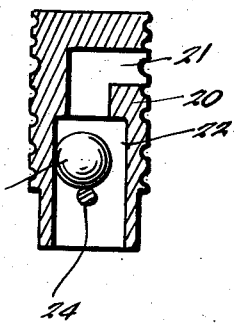
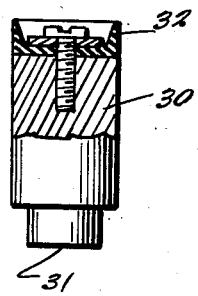
Inventor
Joseph Cosentino
By Clarence A. O'Brien
Hyman Berman
Attorneys Patented May 31, 1938

2,119,453

UNITED STATES PATENT OFFICE 2,119,453

SHOCK ABSORBER

Joseph Cosentino, Clarksburg, W. Va.

Application February 24, 1937, Serial No. 127,512

2 Claims. (Cl. 267—8)

This invention relates to shock absorbers, and more particularly to shock absorbers designed for use on automobiles for enhancing the riding qualities of the vehicle.

An object of the invention is to provide a shock absorber as and for the purpose mentioned, and which is characterized by simplicity of construction, practicability, and efficiency of operation.

The invention, together with its objects and advantages, will be best understood from a study of the following description taken in connection with the accompanying drawings, wherein:

Figure 1 is a side elevational view illustrating the application of the invention.

Figure 2 is a view at right angles to Figure 1 further illustrating the invention.

Figure 3 is a side elevational view of the shock absorber viewing the same from the near side thereof.

Figure 4 is a top plan view of the shock absorber with the top plate removed.

Figure 5 is a vertical sectional view taken substantially on the line 5—5 of Figure 2.

Figure 6 is a vertical sectional view taken substantially on the line 6—6 of Figure 3.

Figure 7 is a horizontal sectional view taken substantially on the line 7—7 of Figure 5.

Figure 8 is a vertical sectional view through a removable valve casing.

Figure 9 is a view of a sliding valve core, certain parts being broken away and shown in section.

Figure 10 is a vertical sectional view through a piston.

Figure 11 is an elevational view of a valve cage; and

Figure 12 is a bottom plan view of the valve cage shown in Figure 11.

Referring to the drawings by reference numerals, it will be seen that in the preferred embodiment thereof the improved shock absorber comprises a casting 5 hollowed out to provide a pair of cylinders 6—6, opening through the bottom of the casting. At the lower ends thereof the cylinders 6 are internally threaded for the threaded reception of valve cages 7 and plugs 8.

At their upper ends the cylinders 6 open laterally into an oil reservoir or compartment 9 for which there is provided a removable cover plate 10 secured in position through the medium of bolts or other fastening elements 11.

The cover plate 10 is provided with a suitable filling opening for which a plug 12 is provided.

Between the cylinders 6 the lower portion of the casting 5 is hollowed out to provide a chamber 13 which opens at its lower end through the bottom of the casting 5 and at its upper end is connected with the reservoir 9 through the medium of a passage 14.

A valve cylinder 15 is accommodated within the chamber 13 and at its lower end is threaded as at 16 to complement the internal threads 17 provided at the lower end of the chamber 13, whereby the cylinder 15 is removably secured within the chamber 13 with the periphery of the cylinder 15 spaced from the wall of the chamber 13 above the threads 17 as clearly shown in Figure 5.

The lower end of the cylinder 15 is open, and at said end the cylinder 15 is provided with internal threads 18 for the reception of a screw plug 19.

Pistons 20 have a working fit within the cylinder 6 and are normally urged upwardly through the medium of coil springs 21, the lower ends of which bear on the valve cages 7 and the upper ends of which are suitably engaged with the lower ends of the pistons 20.

In the heads thereof pistons 20 are provided with angular passages 21, while the lower or skirt portions of the pistons are provided to form valve chambers 22 in which loosely work ball valves 23. Valves 23 are loosely retained within the chambers 22 through the medium of transverse pins 24.

At the threaded portion thereof the valve cylinder 15 is provided at diametrically opposite sides with ports 25 that register with ports 28 provided in diametrically opposite sides of the wall of said chamber 13, which ports 28 open into the cylinder 6.

Above the threaded portion thereof, cylinder 15 is provided with a vertical series of minute ports 29 controlled by a piston-like valve core 30 that has a snug working fit within the valve cylinder 15.

The lower end of the valve member 30 is reduced as at 31, while secured to the upper end of the valve member 30 is a cup washer 32 in which seats one end of a spring 33 that acts on the valve member 30 to normally urge the same downwardly for positioning the reduced portion 31 of the member 30 opposite the aligned ports 25, 28.

The casting 5 internally of the chamber or reservoir 9 is provided with a formation 34 of the shape clear from a study of Figures 4 and 6 and between the formation and one wall of the chamber 9 intermediate the cylinders 6 is a rocker arm 31 provided with a shank portion having a squared opening which receives the squared portion 32 of a stub shaft 33.

The stub shaft 33 is suitably journaled in the upper portion of the casting 5, extending through the formation 30 shown in Figure 6, and is suitably equipped at its outer end, and as indicated at 34 to accommodate the split clamp-equipped end of an arm 35.

As shown in Figures 2 and 3, the casting 5 adjacent the upper portion thereof is provided at opposite sides with apertured elongated lugs 36 that accommodate bolts 38 through the medium of which the shock absorber is mounted on the chassis member 39 of an automobile at the side of the chassis member opposite to the arm 35.

Arm 35 is pivotally connected to one end of a link 40, the other end of which is pivoted as at 41 to a member 42 suitably secured to the axle 43 of the automobile.

As shown in Figure 5, the rocker arm 31 has end portions 31a against which the upper ends of the pistons 20 bear.

It will thus be seen that a rocking movement of the arm 31 in either direction will cause one of the pistons to move downwardly against the action of spring 21 forcing oil in said one cylinder 6 through a port 44 of the valve cage 7, the oil passing through the valve cage and through the aligned ports 25, 28 at one side of the chamber 13 to flow around the reduced portion 31 of the valve member 30 to enter the valve casing 7 in the other cylinder 6. Fluid pressure will thus be built up in the second cylinder 6 for closing the valve 23 of the piston 20 working in the second cylinder with the result that a back pressure of oil will be developed on the valve member 30 forcing the latter upwardly against the action of spring 33 to uncover the port 29 permitting oil to flow from the cylinder 15 through the port 29 into the chamber 13. The oil in the chamber 13 passes up and around the valve cylinder 15 to return to the reservoir 9 through the passage 14.

In connection with the above, it will be seen that arranged in each valve cage 7 is a ball valve 45 retained in position through the medium of a transverse pin 46. Also, at the bottom thereof each valve cage 7 at opposite sides is provided with notches 47 that provide at opposite sides of each valve cage ports for the ingress and egress of fluid.

It will thus be seen that with a shock absorber embodying the features of the present invention, when a wheel of the vehicle either moves over a raised obstruction in the road or drops into a depression in the road surface, the shock absorber will operate to absorb the shock resulting from the above, the raising or lowering of the vehicle spring 48 causing movement to be transmitted through the link 40 to the arm 35 for rocking the arm 31 in either direction, it being understood that the same action as above described takes place regardless of whether the arm 31 is caused to rock in a clockwise or counterclockwise direction. It is also understood that in each operation of the shock absorber oil is forced from one cylinder 6 into the chamber 13 to flow from the chamber 13 back to the reservoir 9.

It will also be apparent that on the return stroke of each piston 20 oil from the reservoir 9 will pass through the passage 21 in the head of the piston 20 flowing through the valve chamber 22 into the cylinders 6 so that there will be at all times within the cylinders 6 sufficient fluid below the pistons 20.

It is thought that a clear understanding of the construction, utility and advantages of a shock absorber embodying the features of the present invention will be had without a more detailed description.

Having thus described the invention, what is claimed as new is:

1. In a shock absorber, a fluid reservoir, a pair of parallel cylinders opening at one end into the reservoir to receive fluid from the reservoir, a chamber below the reservoir intermediate said cylinders and having at one end a passage connecting the chamber with the reservoir, ports at opposite sides of the chamber connecting the chamber with the respective cylinders, check valves arranged in said cylinders at the last mentioned end of the latter, a pressure responsive valve operating in said chamber for controlling the return flow of liquid from the cylinders back to the reservoir, pistons mounted for reciprocation in said cylinders and respectively provided with a fluid passage therethrough and a check valve confined within said passage, a rocker arm pivotally mounted within said reservoir and having its respective opposite ends engaging said pistons, and springs arranged in the cylinders between the first mentioned check valves and said pistons and normally urging the pistons in one direction to yieldably engage the ends of the rocker arm.

2. In an automobile, in combination with a chassis bar and an axle, a shock absorber including a liquid containing reservoir mounted on the chassis bar, a pair of parallel cylinders opening at one end into the reservoir, a chamber having a passage leading therefrom to the reservoir and also provided at opposite sides thereof with ports, and said cylinders having ports registering with the ports of said chamber, check valves arranged in said cylinders for controlling the passage of fluid through said ports into said chamber, pistons mounted for reciprocation within said cylinders and provided with passages therethrough and check valves confined within said passages, springs acting on said pistons to normally urge the same in a direction toward said reservoir, a rocker arm pivotally mounted within said reservoir and having its respective opposite ends bearing against said pistons, a shaft on which said rocker arm is mounted, means connecting one end of said shaft with the axle, and a pressure responsive valve arranged in said chamber for controlling the passage of fluid from the cylinders into said chamber and from the chamber to said reservoir.

JOSEPH COSENTINO.